(12) United States Patent
Moy

(10) Patent No.: US 6,883,057 B2
(45) Date of Patent: Apr. 19, 2005

(54) METHOD AND APPARATUS EMBEDDING PCI-TO-PCI BRIDGE FUNCTIONS IN PCI DEVICES USING PCI CONFIGURATION HEADER TYPE 0

(75) Inventor: Andrew Moy, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 10/077,442

(22) Filed: Feb. 15, 2002

(65) Prior Publication Data

US 2003/0158993 A1 Aug. 21, 2003

(51) Int. Cl.[7] .............................................. G06F 13/00
(52) U.S. Cl. ....................................... 710/314; 710/306
(58) Field of Search ................................ 710/306, 310, 710/311, 313, 314

(56) References Cited

U.S. PATENT DOCUMENTS

| | | | |
|---|---|---|---|
| 5,751,975 A | 5/1998 | Gillespie et al. | |
| 5,771,387 A | 6/1998 | Young et al. | |
| 5,859,988 A * | 1/1999 | Ajanovic et al. | ........... 710/306 |
| 5,870,570 A | 2/1999 | Chambers et al. | |
| 5,878,237 A | 3/1999 | Olarig | |
| 5,884,027 A | 3/1999 | Garbus et al. | |
| 5,933,610 A | 8/1999 | Chambers et al. | |
| 5,951,667 A | 9/1999 | Abramson | |
| 6,016,525 A | 1/2000 | Corrigan et al. | |
| 6,108,738 A | 8/2000 | Chambers et al. | |
| 6,157,976 A | 12/2000 | Tien et al. | |
| 6,175,888 B1 * | 1/2001 | Guthrie et al. | ............... 710/310 |
| 6,189,063 B1 | 2/2001 | Rekeita et al. | |
| 6,233,641 B1 * | 5/2001 | Graham et al. | ............. 710/314 |
| 6,240,480 B1 * | 5/2001 | Wong et al. | ................. 710/311 |
| 6,393,508 B1 * | 5/2002 | Rekeita et al. | .............. 710/243 |
| 6,574,695 B1 * | 6/2003 | Mott et al. | ................... 710/302 |

OTHER PUBLICATIONS

PcCI–to PCI Bridge Architecture Specification, Revision 1.1; PCI Special Interest Group, Hillsboro, OR; Dec. 18, 1998; pp.2, 19–23,25,57,62,63,65,69, and 70.*

* cited by examiner

Primary Examiner—Glenn A. Auve
(74) Attorney, Agent, or Firm—Crawford Maunu PLLC

(57) ABSTRACT

A method and apparatus embedding PCI-to-PCI bridge functions in PCI devices using PCI configuration header type 0 is disclosed. The PCI-to-PCI bridge function is implemented in PCI devices using the standard Type 0 PCI Configuration Header that supports up to six Base Address Registers. Having the PCI-to-PCI bridge function integrated with other PCI device functions has the advantage of reducing valuable card real estate and power consumption.

16 Claims, 9 Drawing Sheets

(PRIOR ART)

Fig. 4

METHOD AND APPARATUS EMBEDDING PCI-TO-PCI BRIDGE FUNCTIONS IN PCI DEVICES USING PCI CONFIGURATION HEADER TYPE 0

BACKGROUND OF THE INVENTION

1. Field of the Invention

This invention relates in general to PCI-to-PCI bridges, and more particularly to a method and apparatus embedding PCI-to-PCI bridge functions in PCI devices using PCI configuration header type 0.

2. Description of Related Art

Personal computers (PC) transfer data from disk to CPU, from CPU to memory, or from memory to the display adapter. A PC cannot afford to have separate circuits between every pair of devices. A mechanical switch, like the old phone systems used, would be too slow. The solution is a bus. A bus is simply a common set of wires that connect all the computer devices and chips together. Some of these wires are used to transmit data. Some send housekeeping signals, like the clock pulse. Some transmit a number (the "address") that identifies a particular device or memory location. The computer chips watch the address wires and respond when their identifying number is transmitted. They then transfer data on the other wires.

Buses come in different widths, which are determined by the number of bits that can travel on the bus at one time. The rate at which a bus transfers data, so many bits per second, is referred to as bandwidth. A bus with a higher bandwidth carries more bits per second, so it transfers more information at once. That means the computer operates faster. Buses also have different speeds. Speed is measured in megahertz (MHz), or millions of cycles per second.

The local bus provides a direct path between peripheral devices (graphics boards, memory, the monitor, or programs) and the CPU. This improves both speed and performance. The local bus usually transfers data at the rate of the computer's system clock. Like other computer technologies, the local bus has industry standards to establish compatibility. Local bus architectures started to appear in the late 1980s when the standard I/O busses such as ISA, EISA, and MCA could not provide the level of video performance that graphics-oriented operating systems and environments such as OS/2 and Microsoft® Windows demanded. The two main local bus standards are Peripheral Component Interconnect (PCI) and the VESA Local-Bus (VL-Bus), standardized by the Video Electronics Standards Association (VESA). Both provide a uniform hardware interface for local bus peripherals. Let's take a closer look at each.

The Video Electronics Standards Association (VESA) version of the local bus, the VL-bus, was developed to be a fast-time-to-market solution. It is primarily an extension of the processor bus to allow video to be connected directly to the CPU, bypassing the slow I/O bus bottleneck. As a result, some major limitations, especially compatibility related ones, currently plague the standard, i.e., not every VL-bus card is compatible with every VL-bus based system.

PCI, on the other hand, is an open, non-proprietary local bus standard that was originally proposed by Intel in late 1991 and later embraced by other leading companies in the computer industry. A PCI special interest group (SIG) was formed in June 1992 to promote, oversee, and enhance the development of PCI as an open standard. By late 1993, there were 160 active members of PCI SIG-including computer manufacturers, semiconductor suppliers, add-in board manufacturers, and BIOS vendors. Version 2.0 of the PCI Local Bus was released in April 1993.

PCI provides a processor-independent data path (a bridge) between the CPU and the system's peripherals. It ensures compatibility between PCI add-in boards and PCI systems. This bridge, or buffer, isolates the CPU and peripherals. More than one peripheral can be attached to the same PCI local bus. With PCI, peripherals can be added directly to the motherboard without extra support and circuitry. And the PCI interface is designed to remain compatible with future generations of microprocessors.

PCI devices also have low access latency, which reduces the amount of time a peripheral has to wait for a bus once it has been requested. In a PCI system, the microprocessor operates simultaneously with bus masters instead of waiting for them.

Bus mastering takes advantage of having a separate bus from the processor bus. By having a separate bus, operations on the PCI bus can occur while there is activity on the processor bus. The processor does not need to control the bus. The bus master grabs hold of the bus and sends data over it while the processor is doing something else.

The PCI bus improved the speed and scalability of client/server networks and became an industry standard just a few years after its introduction. The efficient design, Plug and Play capability, high performance and compatibility of the PCI bus with existing standards offers significant advantages over all other expansion and local buses in use today.

In a system where transactions are required to pass between two separate PCI buses, a traditional PCI-to-PCI bridge device is used to handle this task. A peripheral component interconnect (PCI) bridge provides a connection path between two independent PCI buses. The primary function of a PCI-to-PCI bridge is to allow transactions to occur between a device on one PCI bus and a device on the other PCI bus. System and option card designers can use multiple PCI-to-PCI bridges to create an hierarchy of PCI buses. This allows system and option card designers to overcome electrical loading limits.

In a transaction between two PCI devices, the PCI device that initiates the transaction is called the master and the other PCI device is called the target. If the master and target are on different PCI buses, the bus that the master resides on is the initiating bus. The bus that the target resides on is the target bus.

A PCI-to-PCI bridge has two PCI interfaces, each connected to a PCI bus. The PCI interface of the PCI-to-PCI bridge that is connected to the PCI bus that is closest to the CPU is the primary interface. The PCI interface of the PCI-to-PCI bridge that is connected to the PCI bus that is farthest from the CPU is the secondary interface. Similarly, the PCI bus that is connected to the primary interface of the PCI-to-PCI bridge is called the primary PCI bus. The PCI bus that is connected to the secondary interface of the PCI-to-PCI bridge is called the secondary bus.

A PCI-to-PCI bridge acts essentially as an intermediary between devices located on the secondary bus and devices that are located on the primary bus. The two interfaces of the PCI-to-PCI bridge bus are capable of both master and target operations. The PCI-to-PCI bridge acts as a target on the initiating bus on behalf of the target that actually resides on the target bus. Similarly, the PCI-to-PCI bridge functions as a master on the target bus on behalf of the master that actually resides on the initiating bus. To devices located on the primary bus, the PCI-to-PCI bridge appears as one device where it actually represents several PCI devices that are located on the secondary bus. A detailed specification for PCI-to-PCI bridges is set forth in "PCI-to-PCI Bridge Architecture Specification", Revision 1.0, Apr. 5, 1994, PCI Special Interest Group, Hillsboro, Oreg.

However, a PCI-to-PCI bridge device requires extra card real estate and increases overall power dissipation. With the increase in circuit density of ASIC (Application Specific Integrated Circuit) technology, there is a strong desire for system developers to integrate or embed the PCI-to-PCI bridge function with other PCI high-function devices that are attached to the same primary PCI bus.

One problem with this integration is that the PCI-to-PCI bridge function requires a Type 1 PCI Configuration Header that allows only two Base Address Registers for internal registers or memory devices. A PCI device that requires more than two PCI Base Address Registers will not be able to embed the PCI-to-PCI bridge function into a single ASIC.

It can be seen then that there is a need for a method and apparatus that implements the PCI-to-PCI bridge function in PCI devices in a manner that supports a greater number of Base Address Registers.

SUMMARY OF THE INVENTION

To overcome the limitations in the prior art described above, and to overcome other limitations that will become apparent upon reading and understanding the present specification, the present invention discloses a method and apparatus embedding PCI-to-PCI bridge functions in PCI devices using PCI configuration header type 0.

The present invention solves the above-described problems by implementing the PCI-to-PCI bridge function in PCI devices using the standard Type 0 PCI Configuration Header that supports up to six Base Address Registers. Having the PCI-to-PCI bridge function integrated with other PCI device functions has the advantage of reducing valuable card real estate and power consumption.

A method in accordance with the principles of the present invention includes providing first bidirectional prefetchable memory transactions between a primary PCI bus and a first secondary PCI bus, the primary PCI bus being coupled to a host system, providing second bidirectional prefetchable memory transactions between the primary PCI bus and a second secondary PCI bus and providing internal memory devices accessible to the primary PCI bus, the first secondary PCI bus and the second secondary PCI bus.

Other embodiments of a method in accordance with the principles of the invention may include alternative or optional additional aspects. One such aspect of the present invention is that the first and second bidirectional prefetchable memory transactions are supported using Type 0 PCI Configuration Headers.

Another aspect of the present invention is that the internal memory devices comprise an internal register bank, a SRAM buffer, and a SDRAM memory controller.

Another aspect of the present invention is that the internal memory devices for the embedded PCI-to-PCI bridge function includes two registers defined to allow flexibility in base address mapping and address range.

Another aspect of the present invention is that the two registers include a map address register to store the mapped PCI base address field for a secondary PCI bus initiator to use during a PCI-to-PCI bridge transaction.

Another aspect of the present invention is that map address registers are used by the secondary bus initiator to pass the PCI bridge base address field from the primary PCI bus to a secondary PCI bus.

In another embodiment of the present invention, a computer system having a PCI device with an embedded PCI-to-PCI bridge coupling secondary buses thereto is disclosed. The computer system includes a system bus connected to a processor and a system memory, a PCI device having an embedded PCI-to-PCI bridge being coupled to the system bus and a plurality of PCI secondary buses connected to said system bus via the PCI-to-PCI bridge, wherein the PCI-to-PCI bridge comprises a primary PCI bus interface, a first secondary PCI bus interface and a second secondary PCI bus interface, the primary PCI bus interface and the first secondary PCI bus interface providing first bidirectional prefetchable memory transactions between the primary PCI bus and a second secondary PCI bus and the primary PCI bus interface and the second secondary PCI bus interface providing second bi-directional prefetchable memory transactions between the primary PCI bus and a second secondary PCI bus; the PCI-to-PCI bridge further comprising internal memory devices accessible to the primary PCI bus interface, the first secondary PCI bus interface and the second secondary PCI bus interface.

Another aspect of the computer system according to the present invention is that the first and second bidirectional prefetchable memory transactions are supported using Type 0 PCI Configuration Headers.

Another aspect of the computer system according to the present invention is that the internal memory devices comprise an internal register bank, a SRAM buffer, and a SDRAM memory controller.

Another aspect of the computer system according to the present invention is that the internal memory devices for the embedded PCI-to-PCI bridge functions includes two registers defined to allow flexibility in base address mapping and address range.

Another aspect of the computer system according to the present invention is that the two registers include a map address register to store the mapped PCI base address field for a secondary PCI bus initiator to use during a PCI-to-PCI bridge transaction.

Another aspect of the computer system according to the present invention is that map address registers are used by the secondary bus initiator to pass the PCI bridge base address field from the primary PCI bus to a secondary PCI bus.

In another embodiment of the present invention a PCI device having an embedded PCI-to-PCI bridge is disclosed. The PCI device includes a primary PCI bus interface coupled to a primary PCI bus, a first secondary PCI bus interface coupled to a first secondary PCI bus, a second secondary PCI bus interface coupled to a secondary PCI bus, and internal memory devices coupled to the primary PCI bus interface, the first secondary PCI bus interface and the second secondary PCI bus interface, wherein the primary PCI bus interface and the first secondary PCI bus interface providing first bi-directional prefetchable memory transactions between the primary PCI bus and the second secondary PCI bus and the primary PCI bus interface and the second secondary PCI bus interface providing second bidirectional prefetchable memory transactions between the primary PCI bus and the second secondary PCI bus.

Another aspect of the PCI device according to the present invention is that the first and second bidirectional prefetchable memory transactions are supported using Type 0 PCI Configuration Headers.

Another aspect of the PCI device according to the present invention is that the internal memory devices comprise an internal register bank, a SRAM buffer, and a SDRAM memory controller.

Another aspect of the PCI device according to the present invention is that the internal memory devices for the embedded PCI-to-PCI bridge functions includes two registers defined to allow flexibility in base address mapping and address range.

Another aspect of the PCI device according to the present invention is that the two registers include a map address register to store the mapped PCI base address field for a secondary PCI bus initiator to use during a PCI-to-PCI bridge transaction.

Another aspect of the PCI device according to the present invention is that map address registers are used by the secondary bus initiator to pass the PCI bridge base address field from the primary PCI bus to a secondary PCI bus.

In another embodiment of the PCI device, the PCI device includes primary PCI bus interface means coupled to a primary PCI bus, first secondary PCI bus interface means coupled to a first secondary PCI bus, second secondary PCI bus interface means coupled to a secondary PCI bus, and means for providing internal memory, the means for providing internal memory being coupled to the primary PCI bus interface means, the first secondary PCI bus interface means and the second secondary PCI bus interface means, wherein the primary PCI bus interface means and the first secondary PCI bus interface means provide first bidirectional prefetchable memory transactions between the primary PCI bus and the second secondary PCI bus and the primary PCI bus interface means and the second secondary PCI bus interface means provide second bidirectional prefetchable memory transactions between the primary PCI bus and the second secondary PCI bus.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 4 illustrates Type 0 and Type 1 configuration address formats;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a PCI-to-PCI bridge function in PCI devices using the standard Type 0 PCI Configuration Header that supports up to six Base Address Registers. Having the PCI-to-PCI bridge function integrated with other PCI device functions has the advantage of reducing valuable card real estate and power consumption. System design complexity can also be simplified since the majority of applications do not need a full function bridge. According to the present invention only the required bridge functions need to be customized and implemented. In addition, more than one PCI-to-PCI bridge function can be embedded into one ASIC, which will allow the integrated PCI device functions to have shared access from all the PCI buses.

Figure 1:
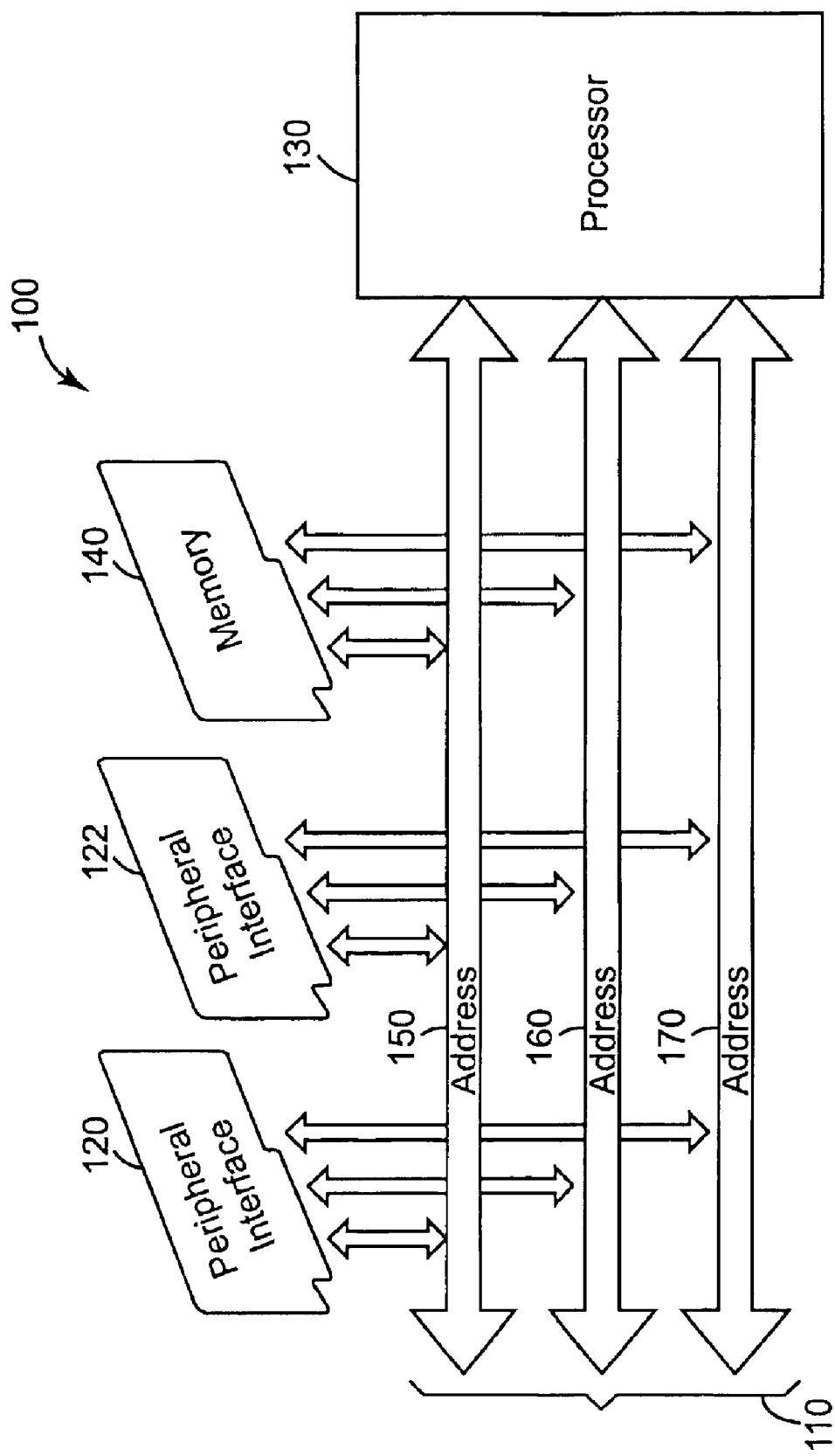
FIG. 1 illustrates a functional diagram of a computer bus.

FIG. 1 illustrates a functional diagram 100 of a computer bus. Fundamentally, a computer bus 110 includes a set of parallel "wires" attached to several connectors into which peripheral boards 120, 122 may be plugged. Typically the processor 130 is coupled at one end of these wires. Memory 140 may also be attached via the bus.

The address wires 150 specify the peripheral and register within the peripheral that is being accessed. The data wires 160 carry the information being transferred to or from the peripheral. The control wires 170 carry the signals that effect the data transfer operation. The bus protocol defines the control signals and how the control signals are manipulated. Beyond the basic data transfer, busses typically incorporate advanced features such as interrupts, DMA (direct memory access) and power distribution.

Figure 2:
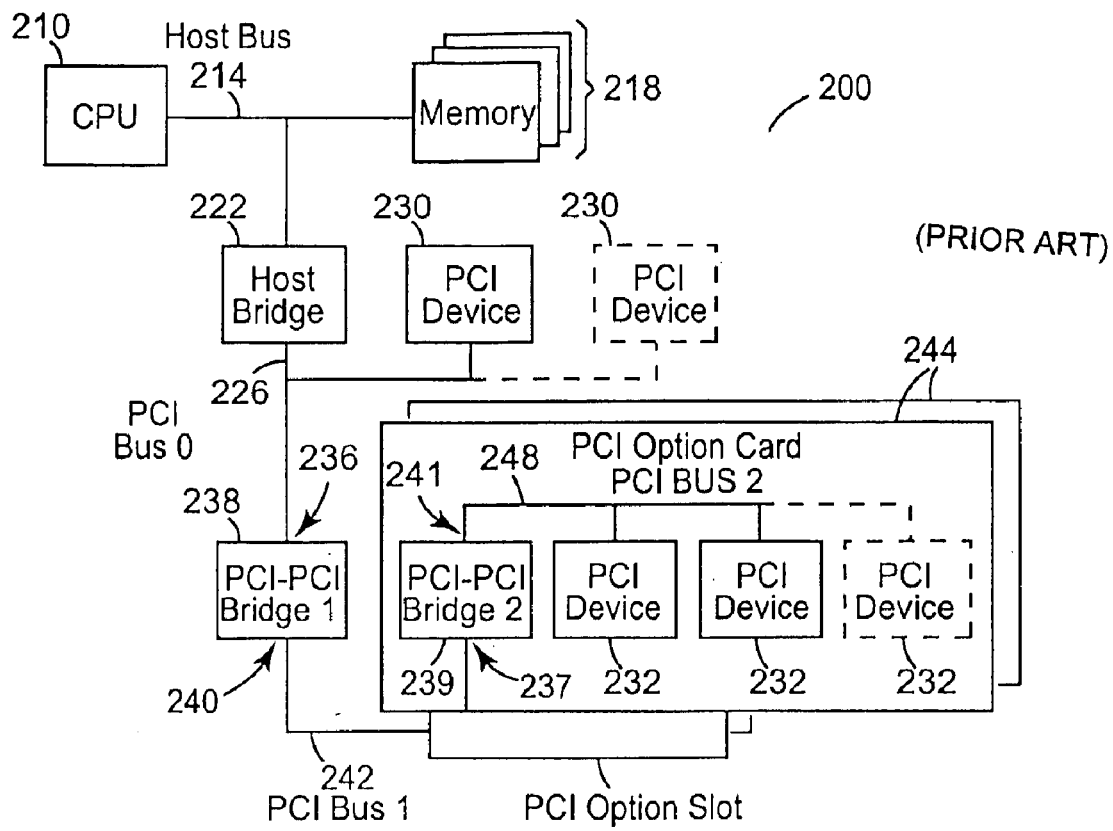
FIG. 2 is a block diagram of typical PCI-to-PCI bridge applications.

FIG. 2 is a block diagram 200 of typical PCI-to-PCI bridge applications. A CPU 210 connects to memory 218 via host bus 214. A host bridge 222 connects host bus 214 to a PCI bus 226. PCI bus 226 connects PCI devices 230 to host bridge 222. PCI bus 226 also connects to a PCI-to-PCI bridge 238. PCI-to-PCI bridge 238 in turn connects to PCI option cards 244 via PCI bus 242. A second PCI-to-PCI bridge 239 operates via PCI bus 248 to connect PCI devices 232 to PCI bus 242.

The bus that connects to a PCI-to-PCI bridge and is closest to the CPU is the primary bus and connects to the primary interface of the PCI-to-PCI bridge. Therefore, for PCI-to-PCI bridge 238, interface 236 is the primary interface and PCI bus 226 is the primary bus. Accordingly, interface 240 is the secondary interface and PCI bus 242 is the secondary bus. For PCI-to-PCI bridge 239, interface 237 is the primary interface and PCI bus 242 is the primary bus, while interface 241 is the secondary interface and PCI bus 248 is the secondary bus.

In a configuration such as that shown in FIG. 2, each PCI-to-PCI bridge and each PCI bus are numbered for identification. The PCI bus that is the secondary bus for the host bridge is given the name "PCI BUS 0." Therefore, PCI bus 226 is PCI BUS 0. The PCI-to-PCI bridge that uses PCI BUS 0 as its primary interface is given the name "PCI-PCI BRIDGE 1." This corresponds to PCI-to-PCI bridge 238. The PCI bus that acts as the secondary bus to a PCI-to-PCI bridge is given the number of that PCI-to-PCI bridge. Therefore, PCI bus 242 is called "PCI BUS 1" because it is the secondary bus to PCI-PCI BRIDGE 1 (PCI-to-PCI bridge 238). Each PCI-to-PCI bridge and each PCI bus is named in this fashion. Thus, for FIG. 2, PCI-to-PCI bridge 239 is named "PCI-PCI BRIDGE 2" and PCI bus 248 is "PCI BUS 2."

Electrical loading limits, as specified in the PCI Local Bus Specification, Revision 2.1, allow only ten PCI device loads per PCI bus. Therefore, a system that requires more than ten PCI device loads requires a PCI-to-PCI bridge. For example, in FIG. 2, a maximum of 10 PCI devices 230 may connect to PCI bus 226 and host bridge 222. However, PCI-to-PCI bridge 238 appears as one device to PCI bus 226 and host bridge 222. This allows option cards 244 that contain further PCI devices 232 to access PCI bus 226 and host bridge 222 maintaining the specified electrical loading limits.

In operation, if PCI device 232 initiates a transaction to memory 218, PCI device 232 is the master and memory 218 is the target. To complete the transaction, PCI device 232 acts as a master along PCI bus 248 to secondary interface 241 of PCI-to-PCI bridge 239. Then, primary interface 237 of PCI-to-PCI bridge 239 acts as a master to complete a transaction to secondary interface 240 of PCI-to-PCI bridge 238. Next, primary interface 236 of PCI-to-PCI bridge 238 initiates a transaction as master to secondary interface of host bridge 222. Host bridge 222 then acts as master for a transaction to memory 218.

Figure 3:
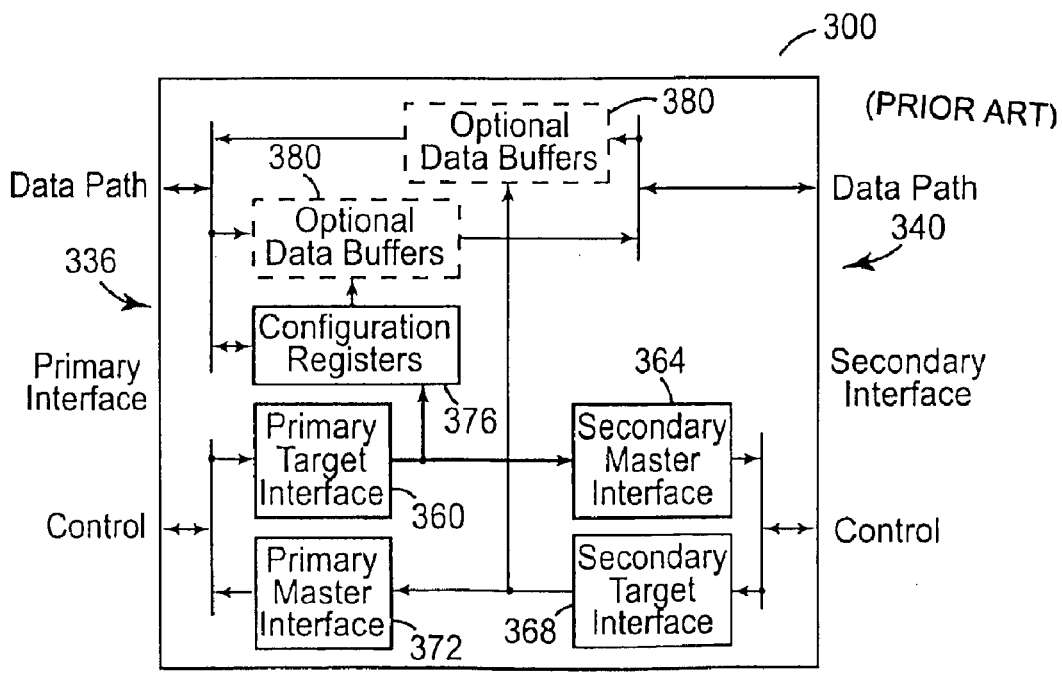
FIG. 3 is a functional block diagram of the typical operation of a PCI-to-PCI bridge.

FIG. 3 is a functional block diagram 300 of the typical operation of a PCI-to-PCI bridge. Data moving downstream first encounters a primary interface 336. This action initiates a primary target interface 360. PCI-to-PCI bridge 300 is acting as the target of the transaction that is taking place on the primary bus. Next, a secondary master interface 364 is triggered, in order for PCI-to-PCI bridge 300 to act as the master of the transaction on the secondary bus. When a transaction moves upstream, a secondary target interface 368 is initiated. PCI-to-PCI bridge 300 is acting as the target of this transaction that is taking place on the secondary bus. Then a primary master interface 372 is initiated. Here, PCI-to-PCI bridge 300 acts as the master to the transaction on the primary bus. These transactions are affected by configuration registers 376 that determine the characteristics of PCI-to-PCI bridge 300. Furthermore, optional data buffers 380 may exist on PCI-to-PCI bridge 300 to buffer data involved in transactions across PCI-to-PCI bridge 300.

Figure 4:
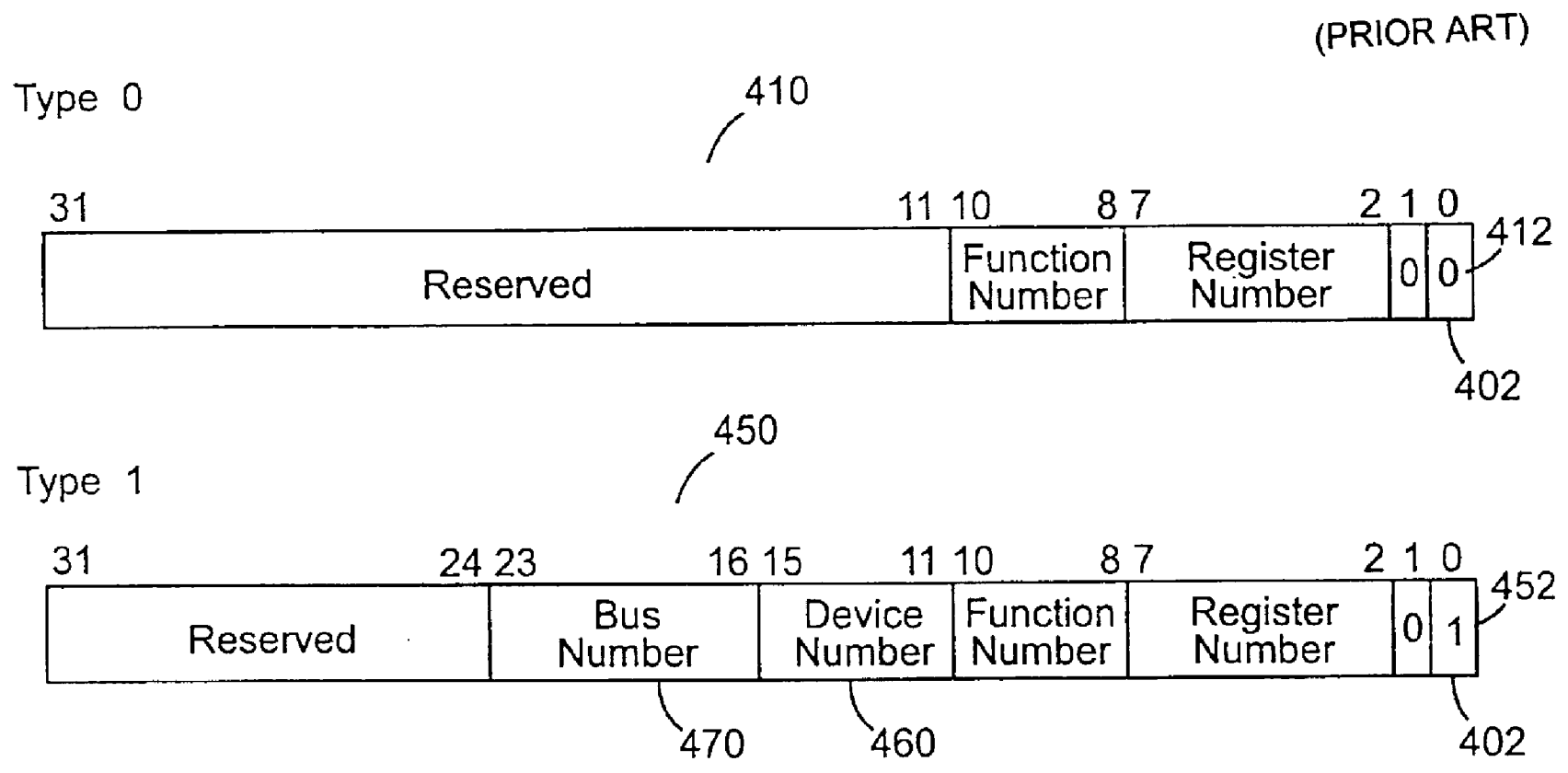

As mentioned above, there are two configuration address formats called Type 0 and Type 1. FIG. 4 illustrates Type 0 410 and Type 1 450 configuration address formats. The two configuration address formats are distinguished by the least significant bit (LSB) 402 of the address where Type 0 is 0 412 and Type 1 is 1 452. The difference is that Type 1 450 includes a device 460 and bus 470 number and Type 0 410 does not. Type 1 450 represents a configuration transaction directed at a target on another (downstream) bus segment whereas a Type 0 410 transaction is directed at a target on the bus where the transaction originated. Type 0 410 transactions are not forwarded across the bridge.

As the Type 1 450 transaction passes from bridge to bridge, it eventually reaches the one whose downstream bus segment matches the bus number in the transaction. That bridge converts the Type 1 450 address to a Type 0 410 or to another Type 1 450 and forwards it to the downstream bus where it is executed.

Figure 5:
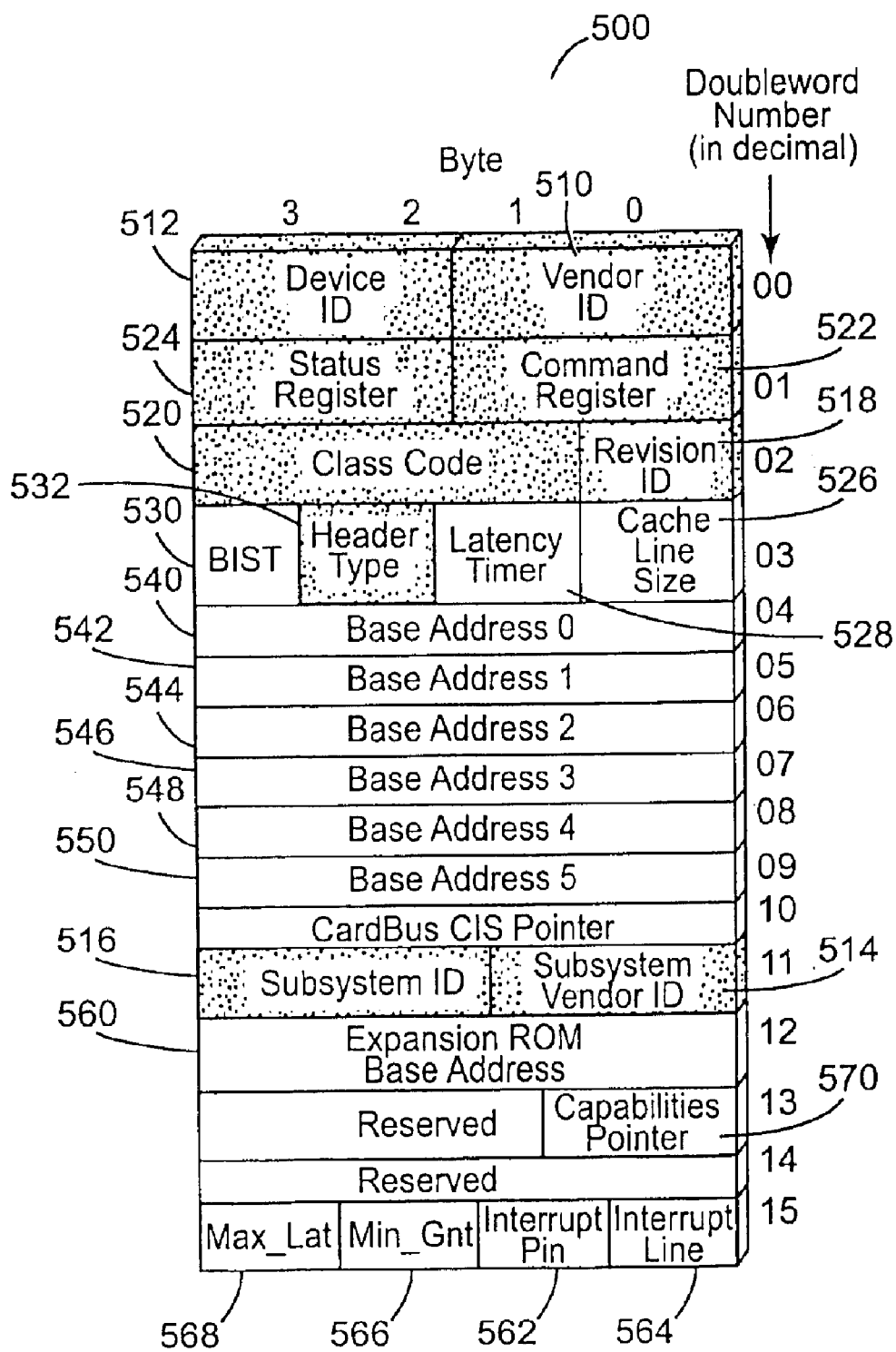
FIG. 5 illustrates the format of Header Type 0 for all devices other than PCI-to-PCI bridges and CardBus bridges.

FIG. 5 illustrates the format of Header Type 0 500 for all devices other than PCI-to-PCI bridges and CardBus bridges. Each PCI function possesses a block of 64 configuration dwords reserved for the implementation of its configuration registers. The format and usage of the first 16 dwords is predefined by the PCI specification. This area is referred to as the device's Configuration Header Region (or Header Space). The specification currently defines three Header formats, referred to as Header Types 0, 1 and 2. Header Type 1 is defined for PCI-to-PCI bridges. Header Type 2 is defined for PCI-to-CardBus bridges. Header Type 0 is used for all devices other than PCI-to-PCI and CardBus bridges.

In FIG. 5, the vendor ID register 510 identifies the manufacturer of the device. The device ID register 512 is assigned by the device manufacture and identifies the type of device. The subsystem vendor ID 514 and subsystem ID registers 516 are used to uniquely identify the add-in card or subsystem that the device resides within. The revision ID register 518 is assigned by the device manufacturer to identify the revision number of the device. The class code register 520 identifies the basic function of the device, a more specific device sub-class and in some cases, a register-specific programming interface. The command register 522 provides basic control over the device's ability to respond to and or perform PCI accesses. The status register 524 tracks the function's status as a PCI entity. The cache line size register 526 is for a master that uses memory write-and-invalidate commands.

The cache line size register 526 is for memory targets that support Cache line Wrap addressing. The cache line size register 526 specifies the system cache line size in dword increments. The latency timer 528 is for masters that perform burst transactions. The latency timer 528 defines the minimum amount of time, in PC clock cycles, that the bus master can retain ownership of the bus whenever it initiates a new transaction. The BIST register 530 s optional. The BIST register 530 may be implemented by both master and target devices. If a device implements a built-in-self-test (BIST) then this register 530 must be implemented. PCI cards should support a standard Configuration Space header. The header type is indicated by the value in the Header Type register 532. The base address registers 540–550 are used if a device implements memory and/or IO decoders. Virtually all devices implement some memory and/or a device-specific register to control the devices.

The expansion ROM base address register 560 is used when a device incorporates a device ROM. The interrupt pin register 562 is used when a PCI function is capable of generating interrupt requests via an interrupt pin. The interrupt line register 564 is used when a PCI device is capable of generating interrupt requests via an interrupt pin. The Min_Gnt register 566 is optional for a bus master and not applicable to non-master devices. The Min_Gnt register 566 indicates how long the master would like to retain PCI bus ownership whenever it initiates a transaction. The Max_Lat register 568 is optional for a bus master and not applicable to non-master devices. The Max_Lat register 568 specifies how often the device needs access to the PCI bus. A capabilities pointer 570 points to entries in a linked series of one or more configuration register sets, each of which may support a new feature.

Figure 6:
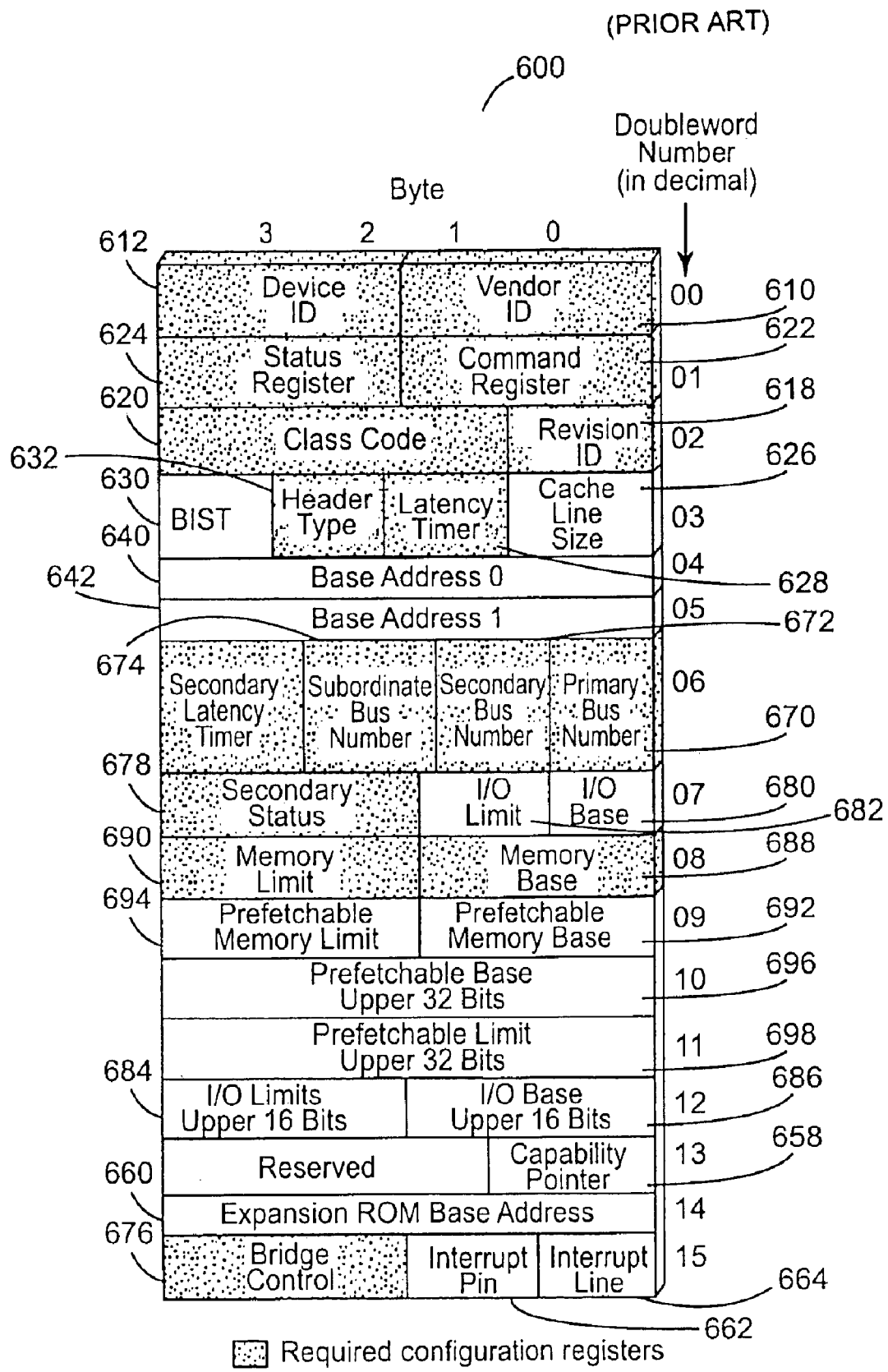
FIG. 6 illustrates the format of Header Type 1 for PCI-to-PCI bridges.

FIG. 6 illustrates the format of Header Type 1 600 for PCI-to-PCI bridges. In FIG. 6, the vendor ID register 610 identifies the manufacturer of the device. The device ID register 612 is assigned by the device manufacture and identifies the type of device. The revision ID register 618 is assigned by the device manufacturer to identify the revision number of the device. The class code register 620 identifies the basic function of the device, a more specific device sub-class and in some cases, a register-specific programming interface.

The primary bus number register 670 is initialized by software with the number of the bridge's bus that is closer to the host processor. The secondary bus number register 672 is initialized in software with the number of the bridge's downstream bus. The subordinate bus number register 674 is initialized by software with the number of the highest-numbered bus that exists on the downstream side of the bridge.

The command register 622 provides basic control over the device's ability to respond to and or perform PCI accesses. The bridge control register 676 is an extension to the bridge's command register. The bridge control register 676 associates with operation of both the primary and the secondary sides. The primary status register 624 tracks the function's status as a PCI entity. The secondary status register 678 reflects the status of the secondary side.

An expansion ROM base address 660 is optional and is only necessary if the bridge implements a bridge-specific device ROM. A capabilities pointer 658 points to entries in a linked series of one or more configuration register sets, each of which may support a new feature.

IO Base 680 and IO limit 682 registers are provided if the bridge supports IO space on the downstream side of the bridge. IO extension registers (IO limit upper 16 bits 684 & IO base upper 16 bits 686) are provided if the bridge supports 4 GB rather than a 64 KB OP address space on the downstream side of the bridge.

The Memory Base 688 and Memory Limit 690 registers are used to support memory-mapped IO behind the bridge. The prefetchable base register 692 and prefetchable limit register 694 indicates the start and end address of the memory range for a 4 GB prefetchable memory on the bridge's secondary side. The prefetchable base upper 32 bits register 696 and prefetchable limit upper 32 bits register 698 are used to extend the prefetchable memory space. The memory-base 688 and memory limit 690 are used to define a memory-mapped IO range.

The cache line size register 626 specifies the system cache line size in dword increments. The latency timer 628 is for masters that perform burst transactions. The latency timer 628 defines the minimum amount of time, in PC clock cycles, that the bus master can retain ownership of the bus whenever it initiates a new transaction. The BIST register 630 is optional. The BIST register 630 may be implemented by both master and target devices. If a device implements a built-in-self-test (BIST) then this register 630 is implemented. PCI cards should support a standard Configuration Space header. The header type is indicated by the value in the Header Type register 632. The base address registers 640, 642 are used when a device implements memory and/or IO decoders. Virtually all devices implement some memory and/or a device-specific register to control the devices. Only two base address registers 640, 642 are provided.

The interrupt pin register 662 is used when a PCI function is capable of generating interrupt requests via an interrupt pin. The interrupt line register 664 is used when a PCI device is capable of generating interrupt requests via an interrupt pin.

As stated above, the main task of a PC-to-PCI bridge is to allow memory transactions to pass between two PCI buses. A PCI-to-PCI bridge can be bi-directional. As options, the PCI bridge may also support other functions such as Prefetchable Memory, I/O transactions, and 64-bit addressing (via Dual Address Cycles) across the bridge as described above.

Figure 7:
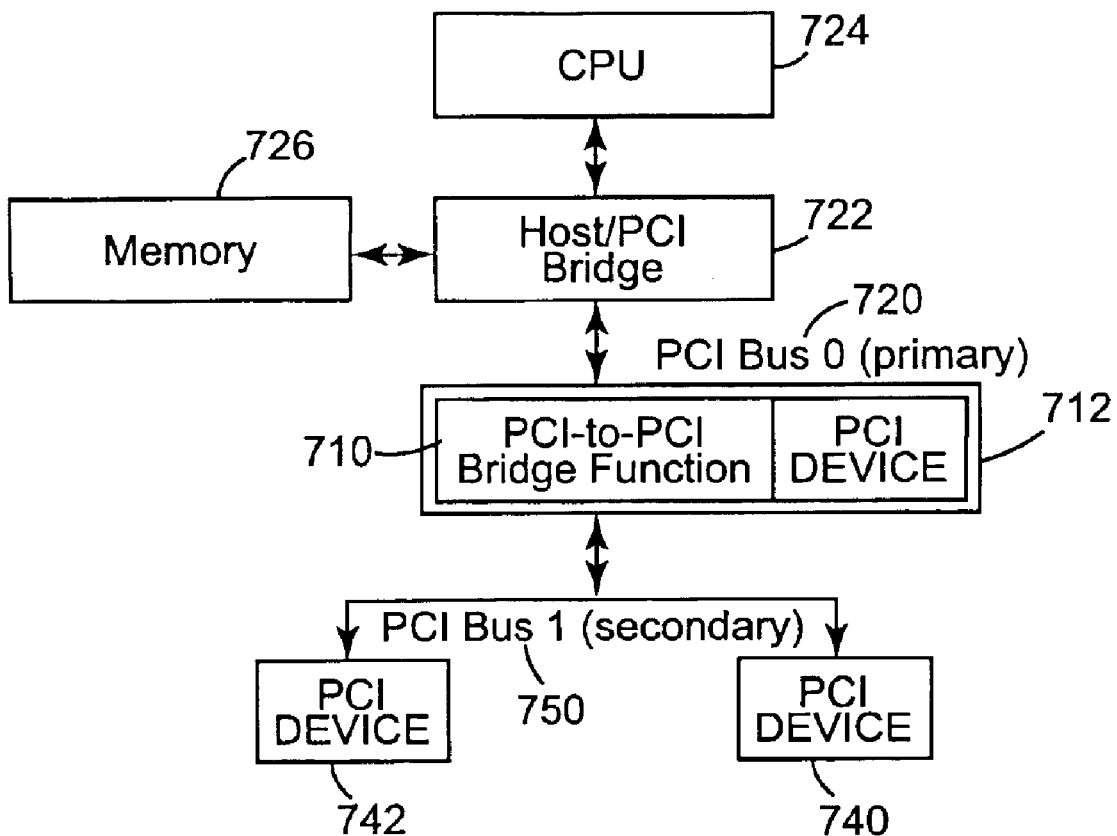
FIG. 7 illustrates an apparatus embedding PCI-to-PCI bridge functions in a PCI device by using PCI configuration header type 0 according to the present invention.

However, as described above, the Type 1 PCI Configuration Header associated with a PCI-to-PCI bridge device allows only two Base Address Registers for internal registers or memory. The present invention is a method and apparatus embedding PCI-to-PCI bridge functions in PCI devices by using PCI configuration header type 0 as illustrated in FIG. 7. Having more Base Address Registers enables more internal device functions to be integrated into the same ASIC.

In FIG. 7, a PCI-to-PCI bridge function 710 is included in a PCI device 712. The PCI device 712 implements a PCI-to-PCI bridge function and uses a standard Type 0 PCI Configuration Header to provide up to six Base Address Registers. The device 712 which includes the embedded PCI-to-PCI bridge function 710 is shown as PCI bus 0 720 and connected to the Host/PCI bridge 722. The Host/PCI bridge 722 is coupled to the host CPU 724 and may also be coupled to memory 726. The embedded PCI-to-PCI bridge function allows two PCI devices 740, 742 to be coupled thereto on the PCI bus 1 750 (secondary bus).

Figure 8:
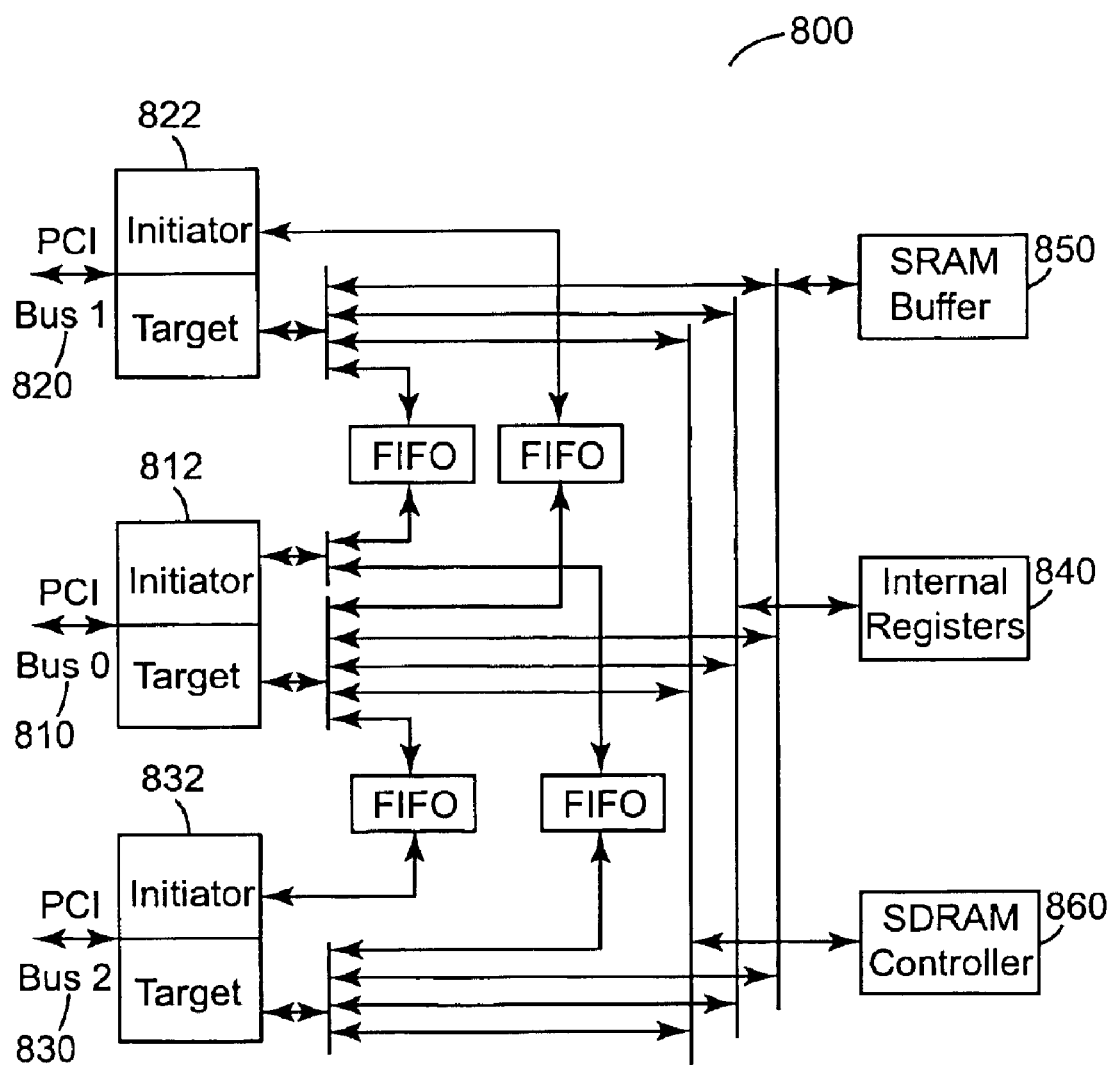
FIG. 8 shows a data flow diagram for a high density ASIC integrating two PCI-to-PCI bridge functions along with several internal memory devices according to one embodiment of the present invention.

According to the present invention, one or more Base Address Registers are assigned to the PCI-to-PCI bridge function and the remaining ones are assigned to other internal device functions. FIG. 8 shows a data flow diagram 800 for a high density ASIC integrating two PCI-to-PCI bridge functions along with several internal memory devices according to one embodiment of the present invention. One of the embedded PCI-to-PCI bridge functions supported is bi-directional Prefetchable Memory transactions between the primary PCI bus (PCI bus 0) 810 and the secondary PCI bus (PCI bus 1) 820, and PCI Configuration transactions from the primary PCI bus (PCI bus 0) 810 to the secondary PCI bus (PCI bus 1) 820, all via a primary 812 and first secondary 822 PCI bus interface. The other PCI-to-PCI bridge function supported is bi-directional I/O transactions between the primary PCI bus (PCI bus 0) 810 and a different secondary PCI bus (PCI bus 2) 830 all via the primary 812 and second secondary 832 PCI bus interface. The internal memory devices, which include an Internal Register bank (256 bytes) 840, a SRAM buffer (4 K bytes) 850, and a SDRAM memory controller (64 M bytes) 860, are accessible from all three PCI buses 810, 820, 830.

Figure 9:
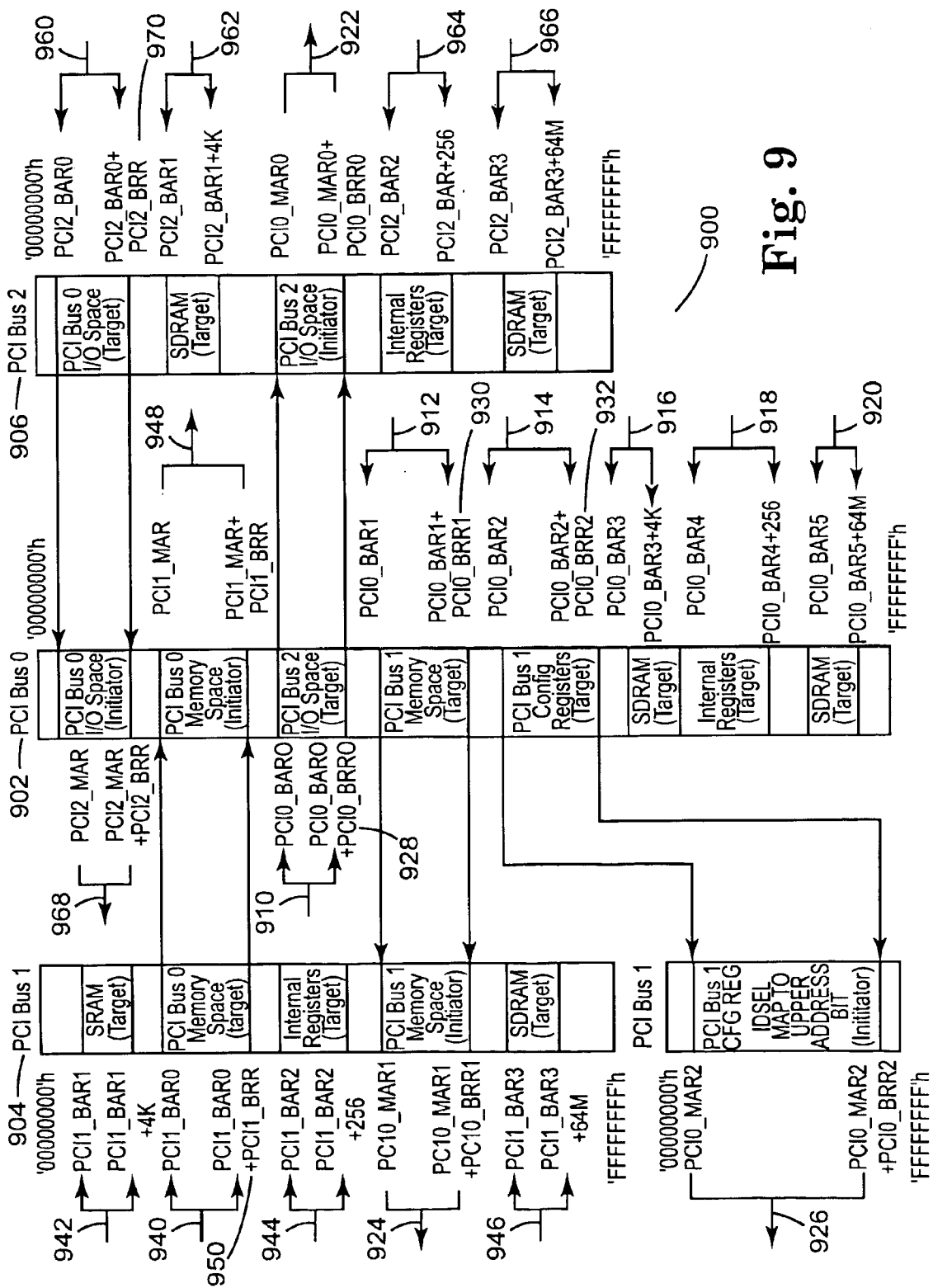
FIG. 9 illustrates a memory map structure for support all of the attached device functions according to an embodiment of the present invention.

FIG. 9 illustrates a memory map structure 900 for support all of the attached device functions according to an embodiment of the present invention. As with any PCI bus system, the memory map structure 900 is defined to support all the attached device functions. Typically, internal memory devices have fixed region sizes. For the embedded PCI-to-PCI bridge function according to an embodiment of the present invention, two 32-bit registers are defined to allow flexibility in base address mapping and address range. The Map Address Register (MAR) stores the mapped PCI base address field for the secondary PCI bus initiator to use during a PCI-to-PCI bridge transaction. Instead of passing the PCI bridge Base Address field from the primary PCI bus 902 to the secondary PCI bus 904, the MAR value is used by the secondary PCI bus initiator. The address range of the PCI-to-PCI bridge memory region is determined by the content of the Bridge Range Register (BRR). All MARs and BRRs are programmable and are configured during system initialization. The Memory map structure illustrated in FIG. 9 uses 32-bit PCI addressing.

In FIG. 9, Base Address Register 0 corresponds to the PCI Configuration Header location at offset '10'h, . . . , BAR5 corresponds to the PCI Configuration Header location at offset '24'h. The notations used in the PCI Address Map diagram of FIG. 9 are defined as follows:

```
PCI0_BAR0 910 = PCI bus 0 base address for PCI bus 2 I/O space.
PCI0_BAR1 912 = PCI bus 0 base address for PCI bus 1 Memory space.
PCI0_BAR2 914 = PCI bus 0 base address for PCI bus 1
Configuration Register space.
PCI0_BAR3 916 = PCI bus 0 base address for SRAM region.
PCI0_BAR4 918 = PCI bus 0 base address for Internal Registers.
PCI0_BAR5 920 = PCI bus 0 base address for SDRAM region.
PCI0_MAR0 922 = PCI bus 0 re-map base address for PCI bus 2 I/O
space.
PCI0_MAR1 924 = PCI bus 0 re-map base address for PCI bus 1
Memory space.
PCI0_MAR2 926 = PCI bus 0 re-map base address for PCI bus 1
Configuration Register space.
PCI0_BRR0 928 = PCI bus 0 region size for PCI bus 2 I/O space.
PCI0_BRR1 930 = PCI bus 0 region size for PCI bus 1 Memory space.
PCI0_BRR2 932 = PCI bus 0 region size for PCI bus 1 Configuration
Register space.
PCI1_BAR0 940 = PCI bus 1 base address for PCI bus 0 Memory space.
PCI1_BAR1 942 = PCI bus 1 base address for SRAM region.
PCI1_BAR2 944 = PCI bus 1 base address for Internal Registers.
PCI1_BAR3 946 = PCI bus 1 base address for SDRAM region.
PCI1_MAR 948 = PCI bus 1 re-map base address for PCI bus 0
Memory space.
PCI1_BRR 950 = PCI bus 1 region size for PCI bus 0 Memory space.
PCI2_BAR0 960 = PCI bus 2 base address for PCI bus 0 I/O space.
PCI2_BAR1 962 = PCI bus 2 base address for SRAM region.
PCI2_BAR2 964 = PCI bus 2 base address for Internal Registers.
PCI2_BAR3 966 = PCI bus 2 base address for SDRAM region.
PCI2_MAR 968 = PCI bus 2 re-map base address for PCI
bus 0 I/O space.
PCI2_BRR 970 = PCI bus 2 region size for PCI bus 0 I/O space.
```

The target base addresses within each PCI address space are programmable via the PCI Configuration Registers during system initialization time. The PCI Target Address is defined as Base Address plus memory Offset:

PCI Target Address=BAR+Offset.

In the present invention, the PCI-to-PCI bridge initiator of the secondary PCI bus 904 may generate PCI addresses based on the Map Address Register content plus the Offset field passed from the primary PCI bus 902:

PCI initiator Address=MAR+Offset.

Since the bi-directional bridge transactions between PCI bus 0 902 and PCI bus 1 904 are designated as prefetchable, the initiator side of the bridge function must avoid crossing the end of the prefetchable memory region boundary. There are two parameters that the bridge initiator can use to set the prefetchable memory limit on the secondary PCI bus 904. The first parameter is the Maximum Prefetch Count, the second is the Last Prefetch Region Address. They are defined as:

Maximum Prefetch Count=Bridge Prefetch Memory Region Size−Address Offset.

Last Prefetch Region Address=Map Base Address+Bridge Prefetch Memory Region Size−1.

The Bridge Prefetch Memory Region Size must be greater than zero, and it's store in PCI0_BRR1 912 in the example. The Map Base Address is stored in PCI0_MAR1 924. I/O transactions between PCI bus 0 902 and PCI bus 2 906 are non-prefetchable (i.e., bit 3 of PCI0_BAR0 910 and PCI2_BAR0 960 is set to zero). Only I/O Read/Write commands are accepted and propagated through this PCI-to-PCI bridge path.

Similarly, PCI Configuration transactions from PCI bus 0 902 to PCI bus 1 904 are also non-prefetchable (i.e., bit 3 of PCI0_BAR2 914 is set to zero). To perform a PCI Configuration transaction from PCI bus 0 902 to PCI bus 1 904, the configuration initiator on PCI bus 0 902 issues a Memory Read or Memory Write Command with an address consists of PCI0_BAR2 914+Offset. The PCI bus 1 904 initiator will convert the Memory command into a Configuration Cycle command on PCI bus 1 904 with an address consists of PCI0_MAR2 926+Offset. The Configuration Cycle command can be implemented as either Type 0 or Type 1.

Dual Address Cycle (DAC) across the embedded PCI-to-PCI bridges can also be supported. The upper 32 bits of the 64-bit target address can be either latched, or mapped like the MAR, when the primary PCI bus target propagates the DAC transaction to the secondary PCI bus initiator. As illustrated above, expansion ROM Base Address support is the same for both Type 0 and Type 1 PCI Configuration headers.

Figure 10:
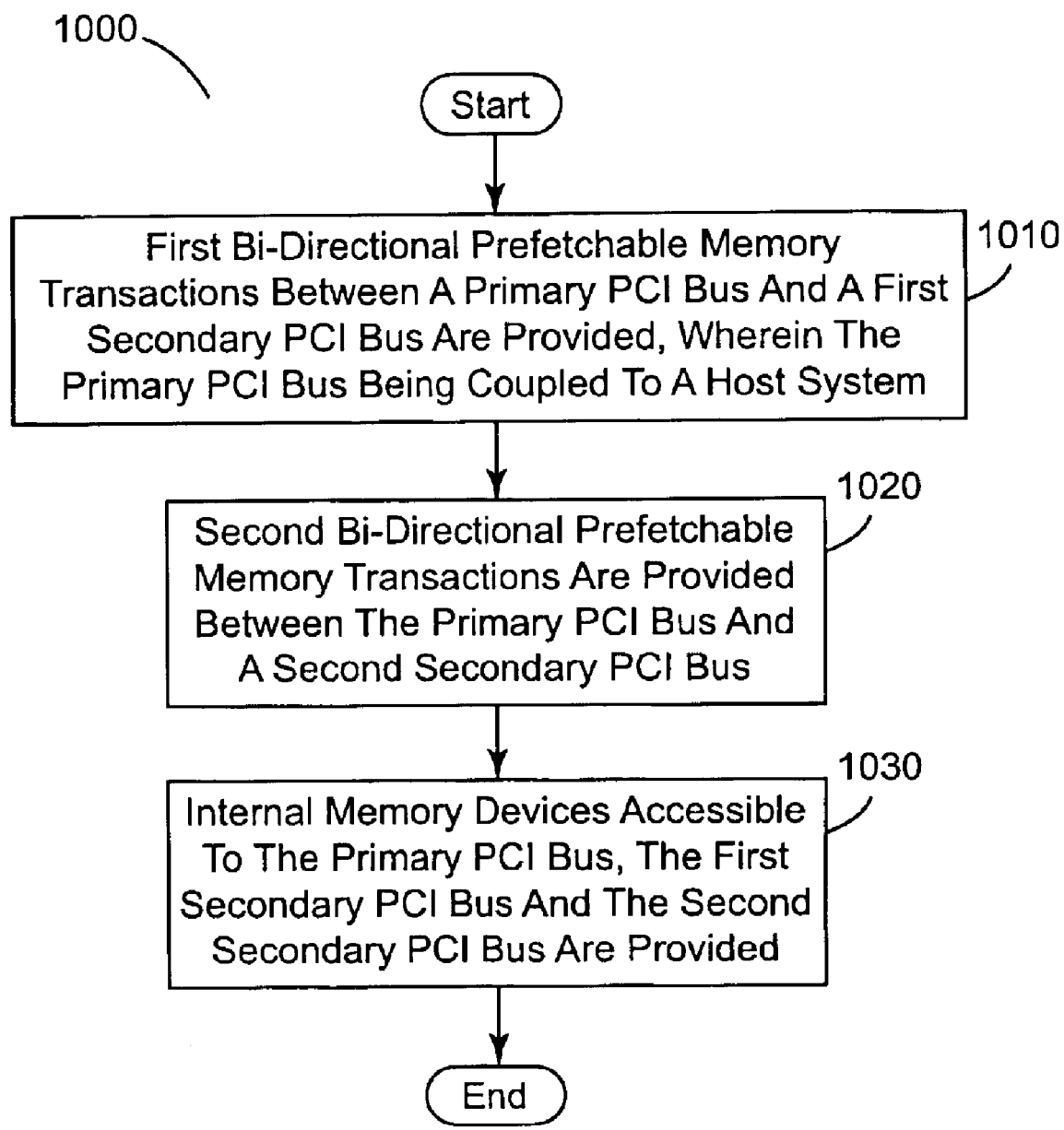
FIG. 10 illustrates a flow chart of the method for providing an embedded PCI-to-PCI bridge functions in PCI devices using PCI configuration header type 0.

FIG. 10 illustrates a flow chart 1000 of the method for providing an embedded PCI-to-PCI bridge functions in PCI devices using PCI configuration header type 0. First bidirectional prefetchable memory transactions between a primary PCI bus and a first secondary PCI bus are provided, wherein the primary PCI bus being coupled to a host system 1010. Second bi-directional prefetchable memory transactions are provided between the primary PCI bus and a second secondary PCI bus 1020. Internal memory devices accessible to the primary PCI bus are provided, the first secondary PCI bus and the second secondary PCI bus 1030. The first and second bidirectional prefetchable memory transactions are supported using Type 0 PCI Configuration Headers. The internal memory devices comprise an internal register bank, a SRAM buffer, and a SDRAM memory controller, wherein the internal memory devices for the embedded PCI-to-PCI bridge function includes two registers defined to allow flexibility in base address mapping and address range. The two registers include a map Address Register to store the mapped PCI base address field for the secondary PCI bus initiator to use during a PCI-to-PCI bridge transaction. Map address registers are used by a secondary bus initiator to pass the PCI bridge Base Address field from the primary PCI bus to a secondary PCI bus.

In summary, PCI bridge applications typically use separate full-function PCI-to-PCI Bridge modules that offer only two Base Address Register for internal target functions as defined by the Type 1 PCI Configuration Header. According to the present invention, a high density ASIC integrate the PCI-to-PCI bridge function with other PCI target devices. The Type 0 PCI Configuration Header that is used in this method offers up to six Base Address Registers. Thus, an advantage of the present invention is valuable card real estate and power dissipation are reduced.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for supporting Peripheral Component Interconnect (PCI) bridge functions within a PCI device, comprising:

providing first bi-directional prefetchable memory transactions between a primary PCI bus and a first secondary PCI bus, the primary PCI bus being coupled to host system;

providing second bi-directional prefetchable memory transactions between the primary PCI bus and a second secondary PCI bus; and providing internal memory devices accessible to the primary PCI bus, the first secondary PCI bus and the second secondary PCI bus;

wherein the first and second bi-directional prefetchable memory transactions are supported using Type 0 PCI Configuration Headers.

2. The method of claim 1 wherein the internal memory devices comprise an internal register bank, a SRAM buffer, and a SDRAM memory controller.

3. The method of claim 1 wherein the internal memory devices accessible to the primary PCI bus, the first secondary PCI bus and the second secondary PCI bus include two registers defined to allow flexibility in base address mapping and address range.

4. The method of claim 3 wherein the two registers include a map address register to store a mapped PCI base address field for a secondary PCI bus initiator to use during a PCI-to-PCI bridge transaction.

5. The method of claim 4 wherein map address registers are used by a secondary bus initiator to pass the PCI bridge base address field from the primary PCI bus to a secondary PCI bus.

6. A computer system having a PCI device with an embedded PCI-to-PCI bridge coupling secondary buses thereto, comprising:

a system bus connected to a processor and a system memory;

a PCI device having an embedded PCI-to-PCI bridge being coupled to the system bus; and a plurality of PCI secondary buses connected to said system bus via the PCI-to-PCI bridge;

wherein the PCI-to-PCI bridge comprises a primary PCI bus interface, a first secondary PCI bus interface and a second secondary PCI bus interface, the primary PCI bus interface and the first secondary PCI bus interface providing first bi-directional prefetchable memory transactions between the primary PCI bus and a first secondary PCI bus and the primary PCI bus interface and the second secondary PCI bus interface providing second bi-directional prefetchable memory transactions between the primary PCI bus and a second secondary PCI bus, the PCI-to-PCI bridge further comprising internal memory devices accessible to the primary PCI bus interface, the first secondary PCI bus interface and the second secondary PCI bus interface, wherein the first and second bi-directional prefetchable memory transactions are supported using Type 0 PCI Configuration Headers.

7. The computer system of claim 6 wherein the internal memory devices comprise an internal register bank, a SRAM buffer, and a SDRAM memory controller.

8. The computer system of claim 6 wherein the internal memory devices accessible to the primary PCI bus interface, the first secondary PCI bus interface and the second secondary PCI bus interface include two registers defined to allow flexibility in base address mapping and address range.

9. The computer system of claim 8 wherein the two registers include a map address register to store a mapped PCI base address field for a secondary PCI bus initiator to use during a PCI-to-PCI bridge transaction.

10. The computer system of claim 9 wherein map address registers are used by a secondary bus initiator to pass the PCI bridge base address field from the primary PCI bus to a secondary PCI bus.

11. A PCI device having an embedded PCI-to-PCI bridge, comprising:

a primary PCI bus interface coupled to a primary PCI bus;

a first secondary PCI bus interface coupled to a first secondary PCI bus;

a second secondary PCI bus interface coupled to PCI bus; and internal memory devices coupled to the primary PCI bus interface, the first secondary PCI bus interface and the second secondary PCI bus interface;

wherein the primary PCI bus interface and the first secondary PCI bus interface providing first bi-directional prefetchable memory transactions between the primary PCI bus and the first secondary PCI bus and the primary PCI bus interface and the second secondary PCI bus interface providing second bi-directional prefetchable memory transactions between the primary PCI bus, and the second secondary PCI bus wherein the first and second bi-directional prefetchable memory transactions are supported using Type 0 PCI Configuration Headers.

12. The PCI device of claim 11 wherein the internal memory devices comprise an internal register bank, a SRAM buffer, and a SDRAM memory controller.

13. The PCI device of claim 11 wherein the internal memory devices accessible to the primary PCI bus interface, the first secondary PCI bus interface and the second secondary PCI bus interface include two registers defined to allow flexibility in base address mapping and address range.

14. The PCI device of claim 13 wherein the two registers include a map address register to store the mappeed PCI base address field for a secondary PCI bus initiator to use during a PCI-to-PCI bridge transaction.

15. The PCI device of claim 14 wherein map address registers are used by the secondary bus initiator to pass the PCI bridge base address field from the primary PCI bus to a secondary PCI bus.

16. A PCI device having an embedded PCI-to-PCI bridge, comprising:

primary PCI bus interface means coupled to a primary PCI bus;

first secondary PCI bus interface means coupled to first secondary PCI bus;

second secondary PCI bus interface means coupled to a secondary PCI bus; and means for providing internal memory, the means for providing internal memory is coupled to the primary PCI bus interface means, the first secondary PCI bus interface means and the second secondary PCI bus interface means;

wherein the primary PCI bus interface means and the first secondary PCI bus interface means provide first bi-directional prefetchable memory transactions between the primary PCI bus and the first secondary PCI bus and the primary PCI bus interface means and the second secondary PCI bus interface means provide second bi-directional prefatchable memory transactions between the primary PCI bus and the second secondary PCI bus, wherein the first and second bi-directional prefetchable memory transactions are supported using Type 0 PCI Configuration Headers.

* * * * *